(12) United States Patent
Wallis

(10) Patent No.: US 6,763,788 B2
(45) Date of Patent: Jul. 20, 2004

(54) VARIABLE TIMING MECHANISM FOR A ROTARY VALVE

(75) Inventor: Anthony Bruce Wallis, Gladesville (AU)

(73) Assignee: Bishop Innovation Limited, North Ryde (AU)

( * ) Notice: Subject to any disclaimer, the term of this patent is extended or adjusted under 35 U.S.C. 154(b) by 0 days.

(21) Appl. No.: 10/276,323

(22) PCT Filed: May 30, 2001

(86) PCT No.: PCT/AU01/00640

§ 371 (c)(1),
(2), (4) Date: Nov. 25, 2002

(87) PCT Pub. No.: WO01/92705

PCT Pub. Date: Dec. 6, 2001

(65) Prior Publication Data

US 2003/0116108 A1 Jun. 26, 2003

(30) Foreign Application Priority Data

May 30, 2000 (AU) .............................................. PQ7836

(51) Int. Cl.⁷ .............................. F02D 13/02; F01L 7/02
(52) U.S. Cl. ................................ 123/80 BA; 123/190.8
(58) Field of Search .............................. 123/80 BA, 86, 123/190.12, 190.1, 190.8, 190.2

(56) References Cited

U.S. PATENT DOCUMENTS

| 4,036,184 A | * | 7/1977 | Guenther ............... 123/80 BA |
| 4,163,438 A | | 8/1979 | Guenther |
| 4,421,077 A | * | 12/1983 | Ruggeri .................. 123/80 BA |
| 5,205,251 A | * | 4/1993 | Conklin ................. 123/190.12 |
| 5,410,996 A | * | 5/1995 | Baird ..................... 123/80 BA |
| 5,526,780 A | | 6/1996 | Wallis |
| 5,579,730 A | * | 12/1996 | Trotter .................. 123/80 BA |
| 5,706,775 A | | 1/1998 | Schweter |
| 5,711,265 A | | 1/1998 | Duve |
| 6,443,110 B2 | * | 9/2002 | Qattan .................... 123/80 BA |
| 6,443,116 B1 | * | 9/2002 | Dahlborg ............... 123/80 BA |

* cited by examiner

*Primary Examiner*—Henry C. Yuen
*Assistant Examiner*—Jason Benton
(74) *Attorney, Agent, or Firm*—Arent Fox PLLC

(57) ABSTRACT

A variable valve timing mechanism for an internal combustion engine comprising at least one rotary valve (1) having at least two ports terminating as openings (2, 3) in its periphery, a cylinder head (7) having a bore in which the rotary valve (1) rotates, and a window (6) in the bore communicating with a combustion chamber (8). The openings (2, 3) successively align with the window (6) by virtue of the rotation. The mechanism also comprises a drive mechanism (13) driving the rotary valve (1). The at least two ports (2, 3) of the rotary valve (1) are an inlet port and an exhaust port. The drive mechanism (13) varies the angular velocity of the rotary valve (1) at least within a portion of at least one engine cycle while maintaining an average angular velocity over the at least one engine cycle that has a fixed relation to the average angular velocity of crankshaft over the at least one cycle.

13 Claims, 13 Drawing Sheets

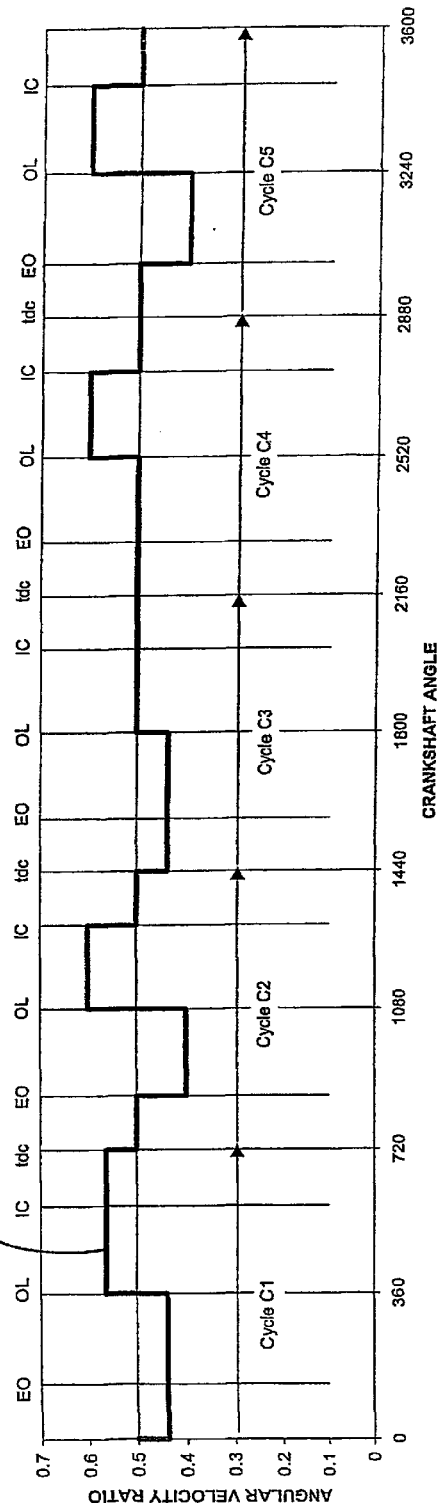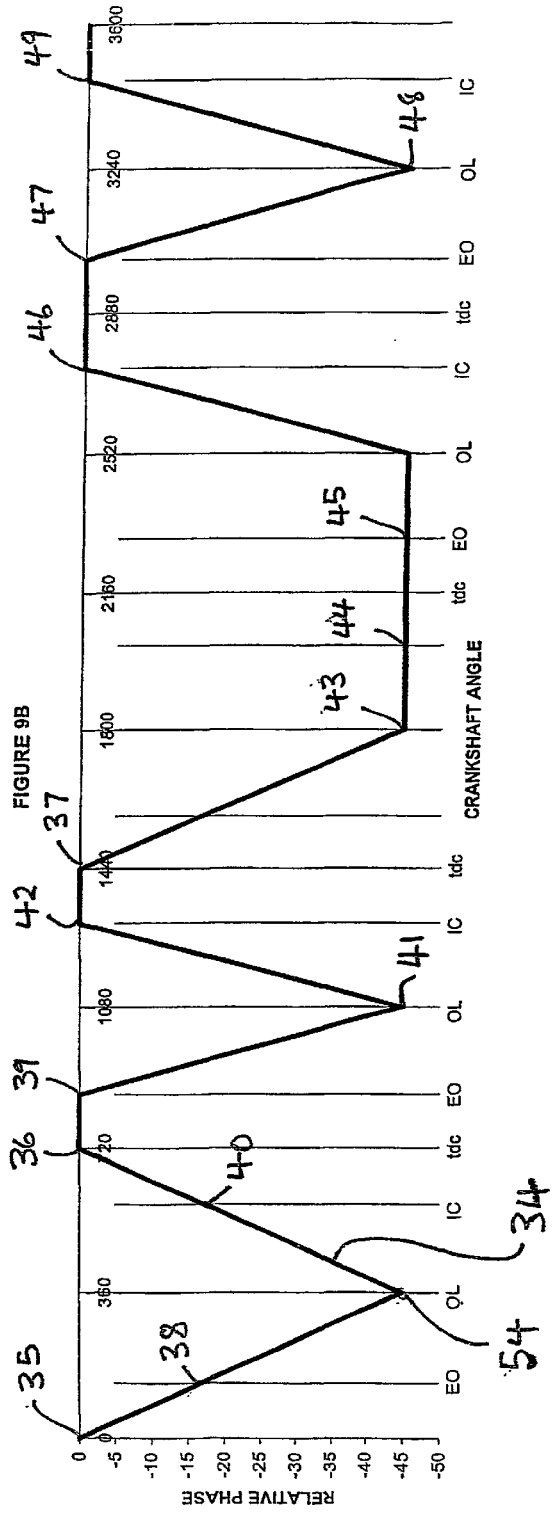

US 6,763,788 B2

VARIABLE TIMING MECHANISM FOR A ROTARY VALVE

TECHNICAL FIELD

The present invention relates to a variable valve timing mechanism for a rotary valve assembly used in an internal combustion engine, and more particularly to a variable valve timing mechanism where both the inlet port and the exhaust port are in the same rotary valve.

BACKGROUND

Rotary valve arrangements have been proposed by many people. One recent example is that proposed by U.S. Pat. No. 5,526,780 (Wallis). Common to all these valve arrangements is an opening in the rotary valve's periphery that periodically aligns with a similar shaped window in the combustion chamber. When the opening in the rotary valve's periphery aligns with the window in the combustion chamber, fluid can pass into (in case of the inlet stroke) and out of (in the case of the exhaust stroke) the combustion chamber. When the opening in the valve's periphery is not aligned with the window in the combustion chamber the contents of the cylinder are trapped during the compression and combustion stroke.

In most prior art arrangements the rotary valve is driven at a fixed angular velocity ratio to the crankshaft. This is achieved by way of mechanical drive mechanisms such as gear trains, chain drives or belt drives which transmit constant angular velocity ratios.

"Angular velocity ratio" is the ratio obtained when the angular velocity of the rotary valve is divided by the angular velocity of the crankshaft. Unless the context requires otherwise any reference made to varying the angular velocity of the rotary valve is made in the context of the angular velocity of the crankshaft remaining constant.

These arrangements all suffer from an inability to vary the engine's valve timing. The duration of the inlet and exhaust process is fixed by the geometry of the window and the respective openings in the rotary valve. In the event that the rotary valve incorporates both, inlet and exhaust ports in the same rotary valve, the angular phase relationship between the inlet and exhaust process is also fixed by the rotary valve geometry.

This inability to vary the valve timing of rotary valve engines is a significant impediment to its widespread adoption in production car engines. Increasingly, more stringent government regulations in the areas of emissions and fuel economy can only be addressed by internal combustion engines that have the ability to vary the engine's valve, timing.

Valve timing is generally expressed as the location of the inlet open, inlet close, exhaust open and exhaust close points relative to the crankshaft position. The crankshaft position is generally specified as an angle relative to a reference location. This is generally chosen to be the location where the piston is at the top of its stroke (i.e. top dead centre—tdc). If the exhaust closes 15° after tdc the exhaust port will cease communication with the cylinder when the crankshaft has rotated 15° from the position where the piston was at top dead centre.

Alternatively valve timing can be thought of as a combination of durations—inlet duration, exhaust duration, close duration and overlap duration, together with an initial position and phase. The initial position determines the relationship between the crankshaft position and the rotary valve position at some point.

"Overlap" is that portion of the engine cycle where both inlet and exhaust ports are both simultaneously open to the combustion chamber.

"Duration" is the angle the crankshaft rotates through between any two events.

"Inlet duration" is the angle the crankshaft rotates through when the inlet port is in communication with the combustion chamber i.e. between inlet open and inlet close. Similarly "exhaust duration" is the angle the crankshaft rotates through when the exhaust port is in communication with the combustion chamber i.e. between exhaust open and exhaust close. "Close duration" is the angle the crankshaft rotates through when neither the inlet nor the exhaust port are open to the combustion chamber i.e. between inlet close and exhaust open. This occurs during the compression and power strokes on a four-stroke, engine. "Overlap duration" is the angle the crankshaft rotates through when both the inlet and exhaust ports are simultaneously open to the combustion chamber i.e. between inlet open and exhaust close.

In all internal combustion engines synchronization of the valve events to their correct position in the engine cycle is essential. Phase is used to describe this synchronization. If the phase is constant from cycle to cycle the valve events will occur in exactly the same position in the cycle from one cycle to the next.

The position in the cycle is defined by the crankshaft position. The position of the rotary valve is described by the angle the valve has rotated from a reference location usually chosen as one of the easily observable valve events—i.e. inlet valve open (ivo), inlet valve close (ivc), exhaust open (evo) or exhaust valve close (evc). For ease of reference in this specification we have chosen the reference location to be ivo. "Rotary valve position" is defined as the angle the valve has rotated from the ivo point.

For conventional rotary valve internal combustion engines using drive mechanisms that deliver constant angular velocity ratio the position of the rotary valve relative to the cycle position can be represented by a graph of the type shown in FIG. 10A. Line 56 defines the position of the rotary valve for all crankshaft positions. So long as the relationship defined by this line occurs on successive cycles, phase has remained constant (and equal to zero i.e. σ=0). In the event the relationship between rotary valve position and crankshaft position is at some other time represented by line 57 a phase change is said to have occurred and its magnitude is σ. In the event line 56 is chosen as the reference, the phase is a σ°.

"Phase" in this context is the distance in crankshaft degrees (° crankshaft) that the line 57 defining constant phase has shifted relative to reference line 56 defining (nominally) zero phase.

In the event an arrangement was used where the drive mechanism delivers a varying angular velocity ratio during the cycle, another relationship represented by lines 58 in FIG. 10B may occur. So long as the mechanism maintains this relationship from cycle to cycle there is no phase change. In the event the rotary valve at some other time follows the relationship shown by lines 59 a phase shift of σ° has occurred and, in the event lines 58 are the reference lines (nominally) defining zero phase, the phase will be a σ°.

In the event the drive mechanism can vary the angular velocity ratio within the cycle and also vary the shape of the angular velocity ratio curve plotted against crankshaft position from cycle to cycle we have a situation shown in FIG. 10C. Lines 60 represents the relationship between valve position and cycle position in one cycle and lines 61 represent the same relationship in the next cycle. Clearly there is a change in synchronization at all points within the cycle. Instantaneous phase changes are occurring at all points within the cycle (at rotary valve position 120° a phase change of σ° has occurred). However the relationship between rotary valve position and cycle position is unaltered at the start and end points of the cycle i.e. there is no change in synchronization or phase at these points.

FIG. 10D shows an alternative outcome from this mechanism. Lines 62 represents the relationship during the first cycle and lines 63 represents the relationship during the next cycle. In this case the end point of the cycle represented by lines 63 is different from the end point of the previous cycle. The phase has been changing within the cycle and at the end of the cycle i.e. there is a change of synchronization both during the cycle and at the end of the cycle.

To distinguish between an arrangement that maintains phase at the start and end of each successive cycle and one that doesn't and also to distinguish between an arrangement which maintains phase at the start and end of each cycle but varies the phase within the cycle and one that doesn't vary the phase within the cycle the following definitions apply.

"Phase" is defined, as the change in crankshaft position for any specified rotary valve position relative to the crankshaft position on the reference cycle or the reference; curve defining this cycle.

"Cyclic phase" is the phase determined by a consideration of the phase at the start and end points only of each cycle and each successive cycle.

In FIGS. 10A and 10B there is no change in phase whilst ever successive cycles sit over the op of lines 56 & 58 respectively. In FIG. 10C there is no cyclic phase change between cycles represented by lines 60 & 61 despite the fact there are changes in phase within the cycle. In FIG. 10D there is a change in cyclic phase of β° between the cycles represented by lines 62 and 63 and changes in phase within the cycle also.

As the definition of start and end points of a cycle is purely arbitrary cyclic phase is defined as remaining constant over that cycle whenever a pair of start and end points separated by one cycle can be found that has the same phase. Cyclic phase is defined as being constant over consecutive cycles when the phase at the end of the next cycle coincides with the phase at the end of the previous cycle. The phase of the rotary valve between the start and end of the cycle may vary between cycles but, whilst ever the phase at the end of consecutive cycles is unaltered, the cyclic phase remains the same. In the case of rotary valves where the angular velocity ratio varies during the cycle, "cyclic phase change" is defined as having occurred whenever two points (start and end points) separated by a cycle can't be found having the same phase and/or the end points of consecutive cycles do not have the same phase.

Various means have been proposed to introduce variation into the valve timing of rotary valves. U.S. Pat. No. 5,205, 251 (Conklin) describes a means of varying the valve timing of a rotary valve engine fitted with two rotary valves per cylinder. One rotary valve contains an inlet port and the other rotary valve contains an exhaust port. The rotary valves are housed inside sleeves and are able to rotate within these sleeves. The sleeves are rotatably disposed within the cylinder head. Timing variation of the inlet or exhaust events is achieved by a combination of rotation of the sleeves and variation of the rotary valves' angular velocity during the cycle.

In this arrangement the variation in the rotary valves' angular velocity during the cycle varies either the inlet and/or the exhaust duration. As this mechanism can vary the magnitude of the duration from one cycle to the next it is also able to introduce phase changes within the cycle. These phase changes must however be symmetric about some selected point in the cycle. This restricts the ability of the mechanism to effect usefully significant phase changes.

As this mechanism is unable to introduce changes in cyclic phase, an additional sleeve mechanism is required to vary the phase in a useful manner. The rotation of the sleeve varies the location of the inlet and/or the exhaust events relative to the crankshaft or the phase of these events relative to the crankshaft. The combination of variations in the angular velocity of the rotary valves and rotation of the sleeves allows independent movement of the inlet open, inlet close, exhaust open, and exhaust close points.

The provision of a sleeve and an additional mechanism to vary its location is additional complication and also introduces additional gas sealing difficulties. U.S. Pat. No. 5,205, 251 remains silent on how gas sealing is achieved. However it is clear that gas sealing will be required between the combustion chamber and the sleeve and between the sleeve and the rotary valve. There is no known practical solution for this arrangement and the requirement to seal in two places merely increases the complexity.

Any arrangement that varies the timing by use of a sleeve requires a window in the cylinder head that is wider than the opening in the valve. This is well illustrated in FIGS. 2 and 5 in U.S. Pat. No. 5,205,251. As the breathing capacity of the rotary valve is determined in part by the width of the opening in the rotary valve, there is no practical requirement for the window in the head to be wider than the rotary valve opening apart from that introduced by the use of the sleeve. The wider window in the cylinder head is a problem from several aspects. Firstly the gas loads imposed on the rotary valve during combustion are directly proportional to the cylinder head window width and are therefore unnecessarily high in the case of applications using sleeves to vary timing. Secondly the volume occupied by these windows is unnecessarily high and makes design of combustion chambers having the required compression ratios difficult.

As stated earlier, the mechanism designed to vary the angular velocity ratio during the engine cycle as-disclosed in U.S. Pat. No. 5,205,251 suffers from the fact that it is only capable of producing symmetric angular velocity ratio profiles. It is the inability of this mechanism to produce an asymmetric angular velocity ratio profile that introduces the requirement for the additional sleeve mechanism.

"Angular velocity ratio profile" means the locus of the rotary valve's angular velocity ratio points plotted against crankshaft angle.

A "symmetric angular velocity ratio profile" is one where a point on the crankshaft angle axis of the angular velocity ratio profile can be found where the angular velocity ratio profile extending over half a cycle either side of this point is symmetric.

An "asymmetric angular velocity ratio profile" is one where no point on the crankshaft angle axis of the angular velocity ratio profile can be found where the angular velocity ratio profile extending over half a cycle either side of this point is symmetric.

An example of a symmetric angular velocity ratio profile is shown in cycle C6 in FIG. 8A. The angular velocity ratio profile of cycle C6 is mirror symmetric about the axis through point 29.

An example of an asymmetric angular velocity profile is shown in cycles C1, C2, and C3 in FIG. 9A. No point can be found within the 0° to 2160° crankshaft angle range where a symmetric angular velocity profile exists over a cycle centred on the point. Another example is shown in FIG. 11.

U.S. Pat. No. 5,711,265 (Duve) describes, a drive mechanism where the angular velocity of the valve is varied during the engine cycle. In this mechanism the valve is indexed to various positions where it remains stationary for a predetermined period before being indexed to its next position. In this arrangement the phase and duration of these events are predetermined by the design of the cam mechanism and are consequently unable to be varied.

The present invention improves the variable valve timing mechanism of an internal combustion engine.

It varies from previous variable valve timing arrangements in that it applies to rotary valve arrangements where both the inlet and exhaust ports are housed in a single rotary valve. This arrangement has the major advantage that a single rotary valve can perform the function of two rotary valves with half the number of components.

Unlike the invention disclosed in U.S. Pat. No. 5,205,251, the change in valve timing is achieved by a single mechanism i.e. it doesn't require a separate sleeve and drive mechanism for this sleeve, to achieve phase change.

Also unlike the invention disclosed in U.S. Pat. No. 5,205,251, the present invention requires sealing only between the combustion chamber and the valve and practical solutions are well known in the art (see U.S. Pat. No. 5,526,780). The variable valve timing, mechanism can be applied to any rotary valve arrangement irrespective of its gas sealing details.

A single rotary valve incorporating both inlet and exhaust ports in the, same valve is a substantial improvement over arrangements requiring separate valves for the inlet and exhaust ports. The following considerations make this clear.

Two important features relevant to all valve mechanisms for internal combustion engines are the rate at which the valve opens and closes and the maximum breathing capacity of the valve system. In the, case of rotary valves the length of the window in the cylinder head and the valve diameter-determine the rate at which the valve opens and closes. The length of the window is geometrically constrained by the requirement to have it located within, the bore of the cylinder and can be made a similar length whether there are one or two valves per cylinder. The maximum breathing capacity is determined by the valve diameter. Thus, for the same maximum breathing capacity, the valve diameter for the rotary valve with a single inlet port must be the same as the valve diameter for a valve with both inlet and exhaust ports in the same valve. Consequently a single valve incorporating both the inlet and exhaust ports in the same valve will have the same maximum breathing capacity and open and close rates (i.e. the same breathing capacity) as will two rotary valves incorporating inlet and exhaust ports in separate valves but with half the number of components.

In addition, a twin rotary valve incorporating inlet and exhaust ports in separate valves will have twice the number of bearings and seals as required with a single valve incorporating both inlet and exhaust ports in the same valve. Consequently friction losses in the two-valve arrangement are potentially double those in the single valve arrangement with both inlet and exhaust ports in the same valve.

In the event that other considerations require the use of two valves per cylinder, a rotary valve incorporating both inlet and exhaust ports in the same valve will have twice the opening and closing rate for the same window length as will two rotary valves of the same diameter incorporating only a single port in each valve. In this case the arrangement with both inlet and exhaust ports in the same valve will have twice the maximum breathing capacity. Consequently two valves incorporating both inlet and exhaust ports in the same valve will have twice the breathing capacity of two valves of the same diameter incorporating the inlet and exhaust valves in separate rotary valves.

Whilst attempts have been made to address the issue of variable valve-timing in rotary valve arrangements where the inlet port and exhaust port are accommodated in separate rotary valves, no attempts have been made to address the inherently more difficult arrangement where both the inlet and exhaust ports are accommodated in the same rotary valve.

This added difficulty arises because, in this latter arrangement, the angular phase relationship between the exhaust events and the inlet events are fixed by the geometry of the rotary valve. A simple phase change between a rotary valve incorporating both inlet and exhaust ports and the crankshaft cannot therefore effect a change in the location of the inlet and exhaust relative to each other. By way of comparison the use of separate rotary valves for the inlet port and the exhaust port means a simple phase change between one or both of the rotary valves and the crankshaft will change the phasing between the inlet and exhaust and will alter the overlap.

Varying the angular velocity of the valve within the cycle can effect significant changes in the duration of those events that have long duration relative to the desired change in duration. For example both inlet and the exhaust events have relatively long duration—typically 230 crankshaft degrees and a significant change in timing is in the order of 40 degrees or 17% of the duration. Consequently significant changes in duration can be achieved by moderate changes in rotary valve angular velocity.

This is not the case with overlap duration. Overlap duration is typically 40° and a significant change in this duration is in the order of 40°. In a rotary valve incorporating both inlet and exhaust ports in the same rotary valve and a cylinder head with fixed window geometry, there is limited ability to effect changes in the overlap duration irrespective of what strategy is adopted.

For example in the extreme arrangement where the rotary valve has zero overlap duration, the bridge on the outer diameter of the valve spanning between the inlet port and the exhaust port has an identical width to that of the window in the cylinder head. As the geometry of both the head and the rotary valve is fixed, there is clearly no way of introducing overlap.

In more conventional arrangements with non-zero overlap duration, small changes could be effected by varying the angular velocity of the rotary valve during the overlap period. If the rotary valve's angular velocity is slower than normal during the overlap the duration will effectively be increased. If the rotary valve's angular velocity is greater than normal during overlap the overlap duration will be decreased. If for example the average rotary valve angular velocity during the overlap was double the average rotary valve angular velocity the overlap duration would be halved. This method is of limited use as large changes in angular velocity effect relatively small changes in overlap. To vary the overlap duration by varying the rotary valve angular velocity during overlap will have very little effect on the overlap duration and will have diminishing effect as the nominal overlap duration decreases.

No practical mechanism of this type could effect a change from say 40° overlap duration to zero overlap duration—a typical requirement. This is an inherent limitation in any rotary valve incorporating both inlet and exhaust ports in the same valve ie. there is limited ability to alter the overlap duration. The present invention uses another strategy to overcome these limitations.

In addition, the presence of both the inlet and exhaust ports in the same rotary valve introduces other constraints not present when the inlet and exhaust ports are in separate rotary valves. As both the inlet port and the exhaust port have a fixed geometric relation to each other it is not possible to introduce changes in duration of one port without considering the impact of such a change on the other port. For example, if the inlet duration was decreased by increasing the rotary valve's angular velocity, a compensating reduction in the rotary valve's angular velocity will have to be made elsewhere in the engine cycle. If this reduction in angular velocity occurs during the exhaust cycle it will increase the duration of the exhaust. If it is desired to leave the duration of the exhaust unaltered (ie the average rotary valve angular velocity during the exhaust stroke is equal to the average angular velocity of the rotary valve over the engine cycle) then the rotary valve's angular velocity must be reduced during the compression and combustion portion of the cycle. The angular velocity ratio profile for this strategy is shown in FIG. 11. It is clearly an asymmetric angular velocity ratio profile.

In order to cater for changes in valve timing in a rotary valve with both inlet and exhaust ports in the same valve, by altering the rotary valves' angular velocity, it is clearly necessary to have a valve drive mechanism capable of producing an asymmetric angular velocity ratio profile. It is a fundamental requirement for a variable valve timing mechanism to produce asymmetric angular velocity profiles if this mechanism is to produce usefully significant phase changes as well as duration changes.

SUMMARY OF INVENTION

According to a first aspect the present invention consists in a variable valve timing mechanism for an internal combustion engine, said engine comprising a crankshaft, a cylinder head, a combustion chamber, and at least one rotary valve, said rotary valve having at least two ports terminating as openings in its periphery, said cylinder head having a bore in which said rotary valve rotates, a window in said bore communicating with said combustion chamber, said openings successively aligning with said window by virtue of said rotation, and a drive mechanism driving said rotary valve, characterised in that said at least two ports comprise an inlet port and an exhaust port, and said drive mechanism varies the angular velocity of said rotary valve at least within a portion of at least one engine cycle whilst maintaining an average angular velocity over said at least one engine cycle that has a fixed relation to the average angular velocity of said crankshaft over said at least one engine cycle, and wherein said drive mechanism produces either a symmetric or assymetric angular velocity ratio profile for said rotary valve with respect to said crankshaft.

Preferably said drive mechanism intermittently varies the angular velocity of said rotary valve over one or more other engine cycles such that the average angular velocity over said one or more other engine cycles varies from said fixed relation.

Preferably said drive mechanism comprises an electric motor.

In a first embodiment said electric motor is directly coupled to said rotary valve.

In a second embodiment said electric motor drives one or more intermediate drive members operably engaged with said rotary valve. Preferably said one or more intermediate drive members comprises any one of a gear, gear train, chain drive assembly or a belt drive assembly.

In a third embodiment said drive mechanism comprises a primary drive means for transmitting motion between said crankshaft and said rotary valve, said primary drive means having at least one epicyclic gear set, and a secondary drive means driving a sun gear of said epicyclic gear set.

In a fourth embodiment said drive mechanism comprises a primary drive means for transmitting motion between said crankshaft and said rotary valve, said primary drive means having at least one epicyclic gear set, and secondary drive means driving one or more planet gears of said epicyclic gear set.

Preferably said secondary drive means is an electric motor.

Preferably said drive mechanism is operably connected to an electronic control unit which controls the angular velocity of said drive mechanism and hence the angular velocity of said rotary valve.

Preferably said secondary drive means is operably connected to an electronic control unit which controls the angular velocity of said secondary drive means and hence the angular velocity of said rotary valve.

According to a second aspect the present invention consists in a variable valve timing mechanism for an internal combustion engine, said engine comprising a crankshaft, a cylinder head, a combustion chamber, and at least one rotary valve, said rotary valve having at least two ports terminating as openings in its periphery, said cylinder head having a bore in which said rotary valve rotates, a window in said bore communicating with said combustion chamber, said openings successively aligning with said window by virtue of said rotation, and a drive mechanism driving said rotary valve, characterised in that said at least two ports comprise an inlet port and an exhaust port, and said drive mechanism is controlled by a control means to vary the angular velocity of said rotary valve, said control means controlling said drive mechanism in response to sensed engine parameters to produce variations of the angular velocity of said rotary valve at least within a portion of at least one engine cycle whilst maintaining an average angular velocity over said at least one engine cycle that has a fixed relation to the average angular velocity of said crankshaft over said at least one engine cycle, and wherein said drive mechanism produces either a symmetric or assymetric angular velocity ratio profile for said rotary valve with respect to said crankshaft.

Preferably said control means is an electronic control unit.

BRIEF DESCRIPTION OF DRAWINGS

FIG. 9 is a chart illustrating various strategies used to effect changes in the valve timing.

MODE OF CARRYING OUT INVENTION

Figure 1:
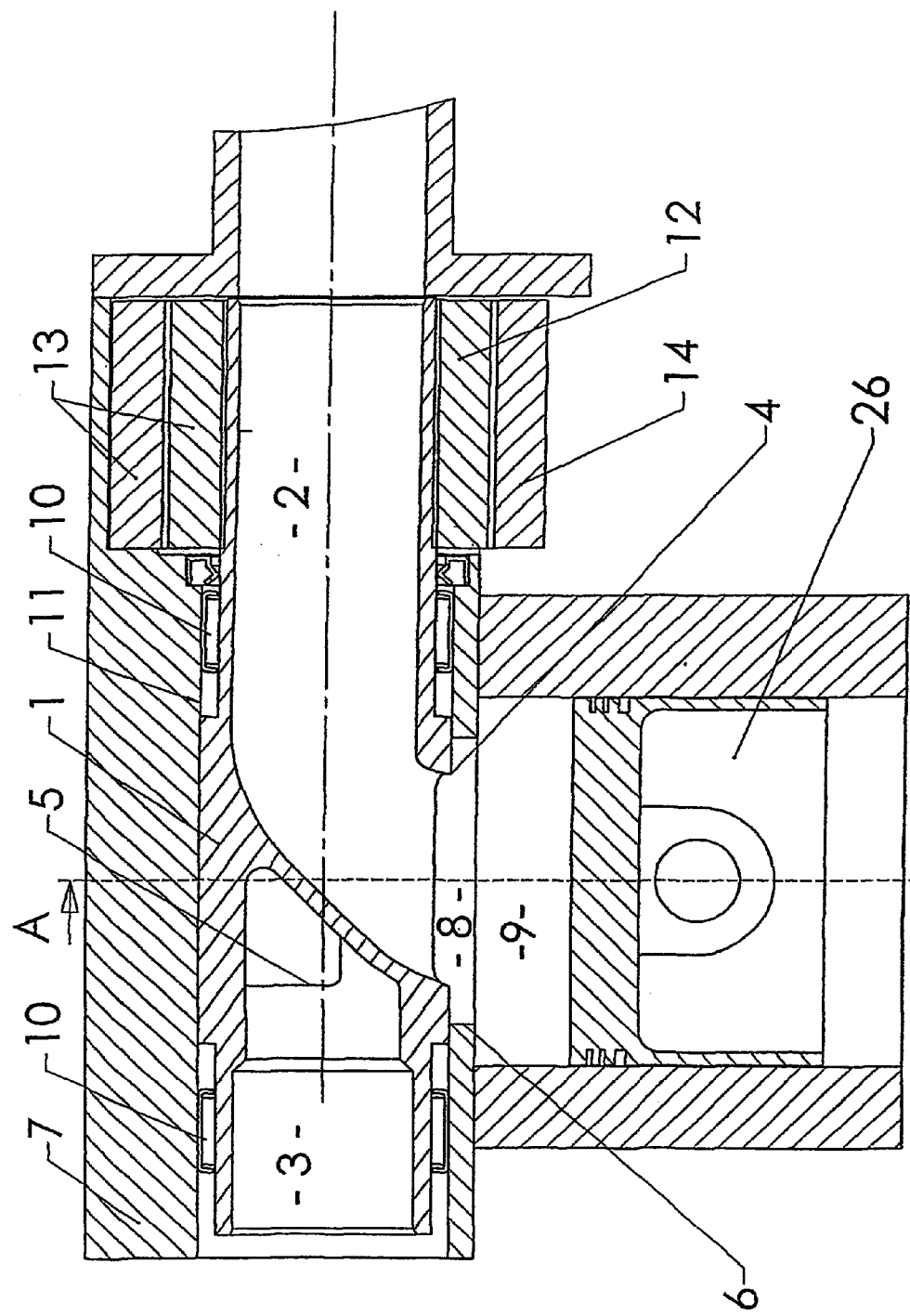
FIG. 1 is a cross sectional view of a first embodiment of a rotary valve having a variable valve timing mechanism in accordance with the present invention.

Prior to describing the preferred embodiments of the present invention a general explanation of the embodiments is given together with important definitions.

The embodiments provide a means whereby the valve timing of a rotary valve assembly for an internal combustion engine may be varied continuously, i.e. both the duration of the inlet and/or exhaust process may be altered together with the phase of the inlet and/or the exhaust process relative to the crankshaft.

By "continuously" it is meant that the rotary valve timing may be altered from one cycle to the next cycle continuously.

In conventional rotary valve internal combustion engines, the duration of the inlet open and the exhaust open is a function of the window width in the plane of rotation and the width of the respective valve openings in the same plane. The present invention recognizes the fact that, if the rotary valve's angular velocity is varied whilst the inlet port or exhaust port is open to the combustion chamber, the effective duration of the inlet or exhaust opening process can be altered.

More generally if the rotary valve's angular velocity is varied between any two events the duration between these events is also varied. If the rotary valve's angular velocity is varied between an inlet and exhaust event the duration between the inlet and exhaust event is also altered despite the fact that the ports themselves are geometrically fixed relative to one another. If for example the rotary valve's angular velocity is increased after the inlet valve closes, the exhaust open point will occur earlier than would otherwise the case.

Thus by varying the angular velocity of the rotary valve the duration of all events (inlet, exhaust, overlap and close) can be altered compared to the duration they would occupy had the angular velocity of the rotary valve remained constant.

For any given engine load and speed there is an optimum valve timing that the valve drive mechanism must deliver every engine cycle whilst ever the engine load and speed remains unchanged. Other variables in addition to load and speed are used as inputs to determine and "map" the optimum valve timing in most modern engines, however load and speed are the most dormant ones. It is therefore necessary for the valve drive mechanism to maintain the optimum synchronization of the rotary valve and the crankshaft cycle after cycle. Any variation introduced to alter the rotary valve's inlet and/or exhaust duration must be compensated by variation elsewhere in the engine cycle to ensure the average angular velocity over the engine cycle maintains a fixed relation to the crankshaft angular velocity. In the case of a four-stroke engine, the average rotary valve angular velocity over the four strokes must equal half the average crankshaft angular velocity over the same 4 strokes—i.e. the required average rotary valve angular velocity ratio is 0.5. In the case of the two-stroke engine the appropriate ratio is one. Unless the context requires otherwise all discussion herein assumes a four-stroke operation.

In the event that the inlet duration is increased by reducing the rotary valve's angular velocity during the inlet stroke, a compensating increase in the rotary valve's angular velocity is necessary elsewhere in the engine cycle. In the event no variation in exhaust duration is desired the rotary valve's angular velocity may be increased during the compression and/or power stroke.

In the event the engine is being accelerated the required valve timing will vary as the engine speed and load conditions vary. To effect the required valve timing as a function of time, the mechanism may be required to vary the angular velocity profile from one cycle to the next. While the phase may be continually changing from cycle to cycle in response to the varying angular velocity profile, the cyclic phase must remain constant (except in the event a deliberate strategy is adopted that involves varying cyclic phase) if correct synchronization of the valve events to the crankshaft position is to be maintained.

In conventional rotary valves where the rotary valve maintains a constant velocity ratio to the crankshaft, the position of the rotary valve is uniquely determined for all crankshaft positions by knowledge of its position at one particular crankshaft position i.e. at its initial position. If for instance we set the angular location of the rotary valve such that the inlet open edge on the rotary valve is just opening when the crankshaft is positioned 15° before tdc, its angular position will then be uniquely defined for all other crankshaft positions. If there is a phase change, the location of the rotary valve will be moved by this phase change for all crankshaft locations.

In a rotary valve arrangement where the angular velocity ratio of the rotary valve varies during the cycle rather than remaining constant the situation is more complex. The position of the rotary valve relative to the crankshaft is no longer uniquely determined by its initial position but by consideration of both its initial position and the history of the rotary valves angular velocity ratio as a function of the crankshaft angle.

By varying the angular velocity of the rotary valve the phase of all events (inlet open, inlet close, exhaust open and exhaust close) will generally be altered compared to the phase they would have had the angular velocity of the rotary valve remained constant. However for a given initial position and angular velocity ratio profile the phase of the rotary valve will be uniquely determined relative to the crankshaft for all crankshaft positions. If the valve is subjected to the same angular velocity ratio profile cycle after cycle and the average angular velocity ratio of the rotary valve over the cycle remains unaltered at the required value, the phase of the valve will clearly remain unaltered cycle to cycle.

Figure 8A:
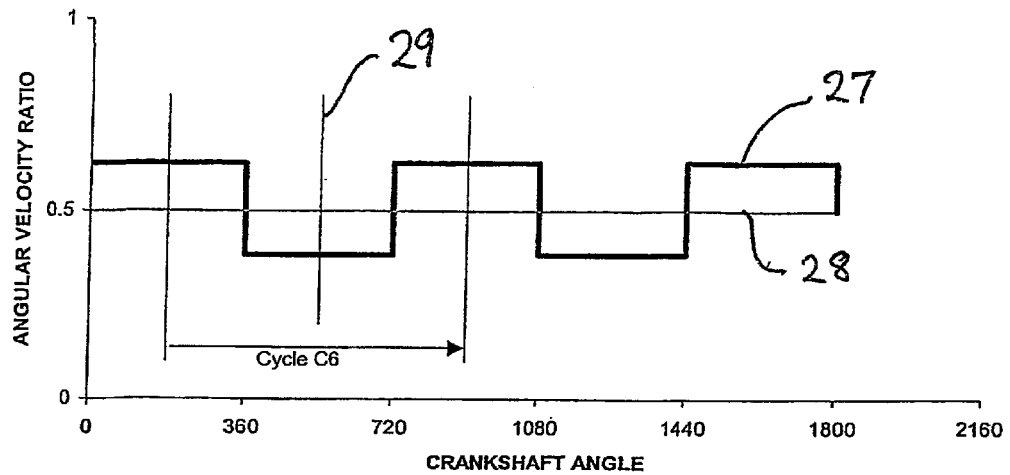
FIG. 8 is a chart illustrating the relationship between angular velocity ratio, phase, and relative phase.
Figure 8B:
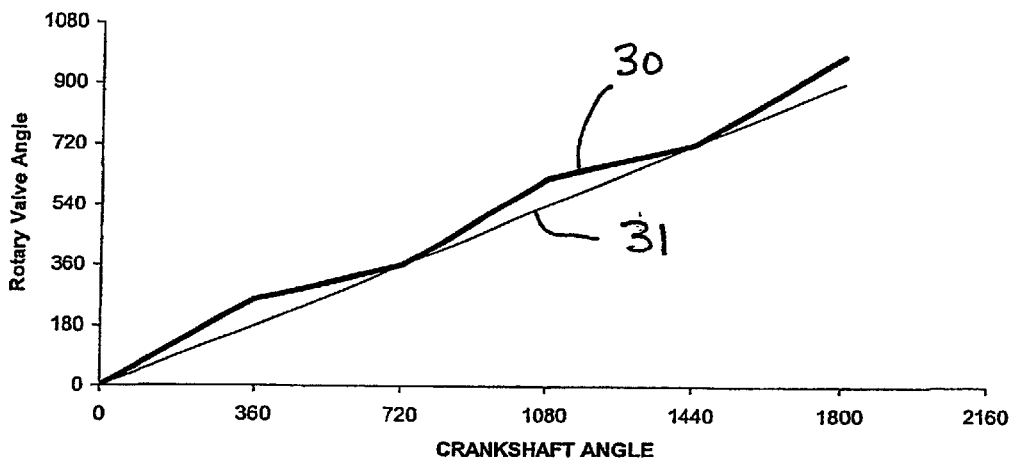
Figure 8C:
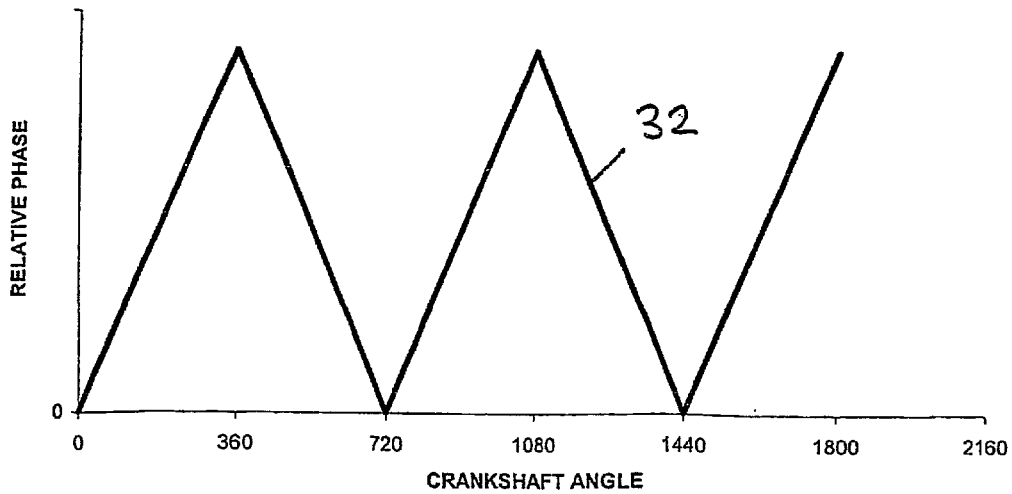
Figure 10A:
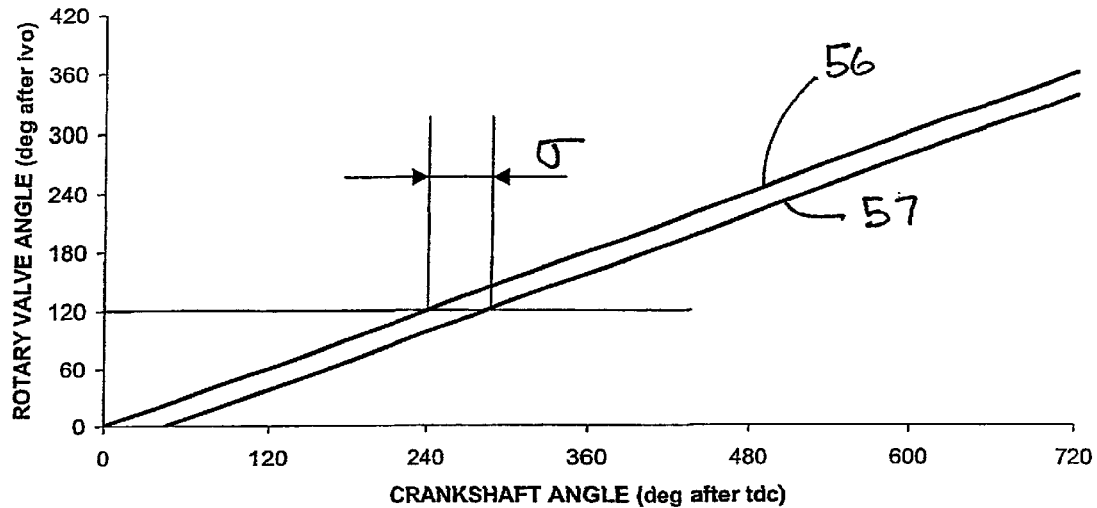
FIG. 10 is a chart used to define the meaning of phase and cyclic phase.
Figure 10B:
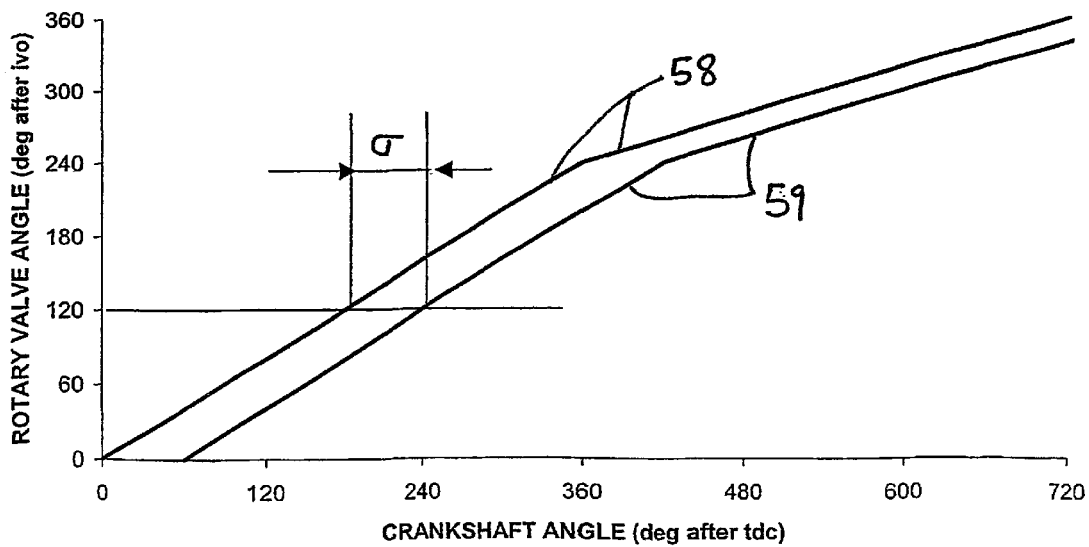
Figure 10C:
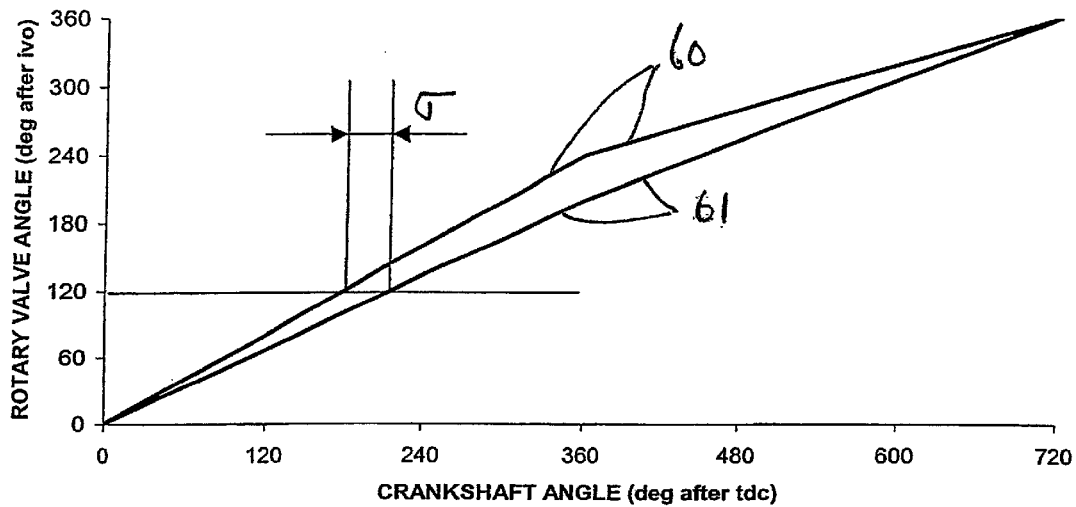
Figure 10D:
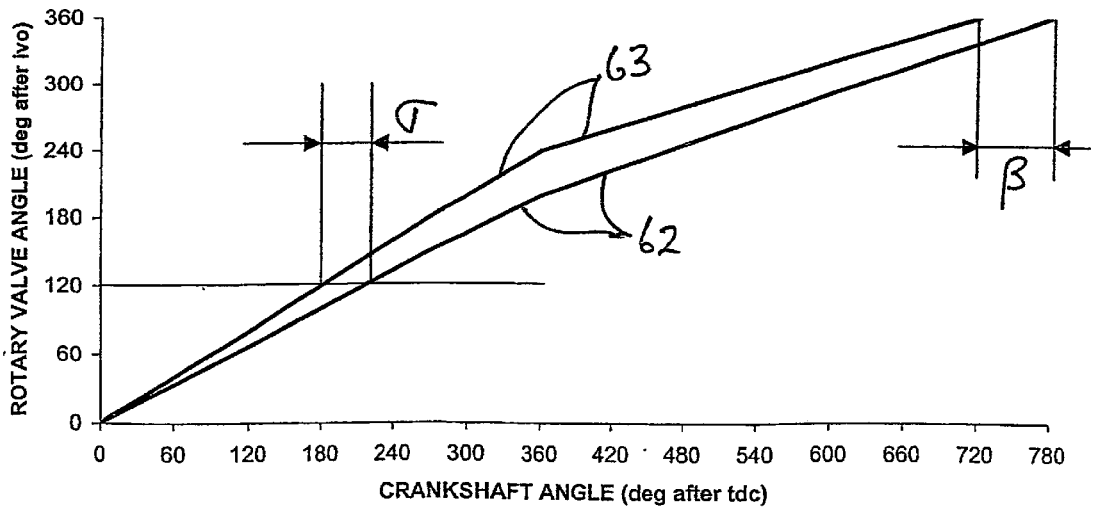
Figure 11:
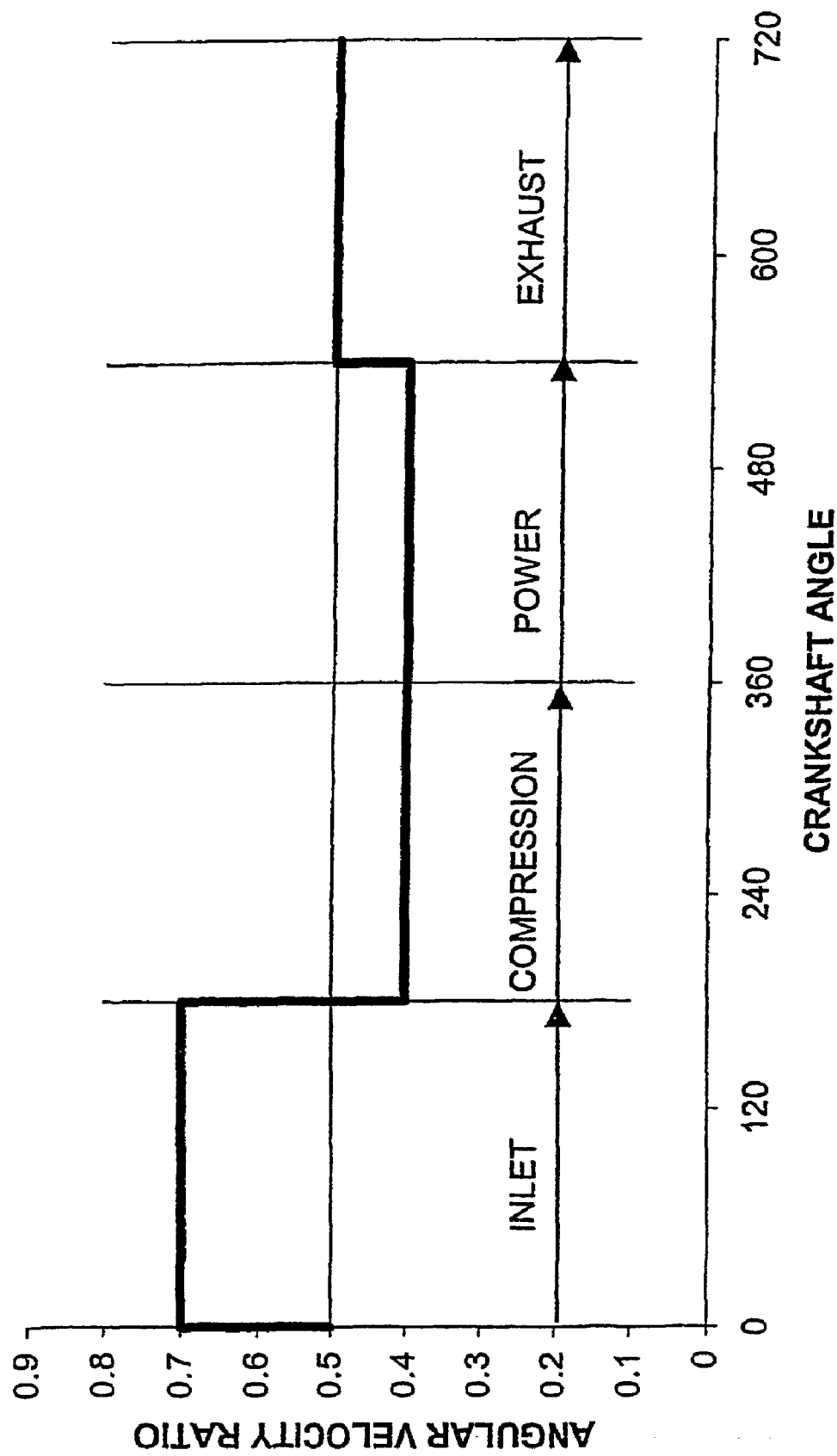
FIG. 11 is a chart illustrating an asymmetric angular velocity profile.
Figure 12:
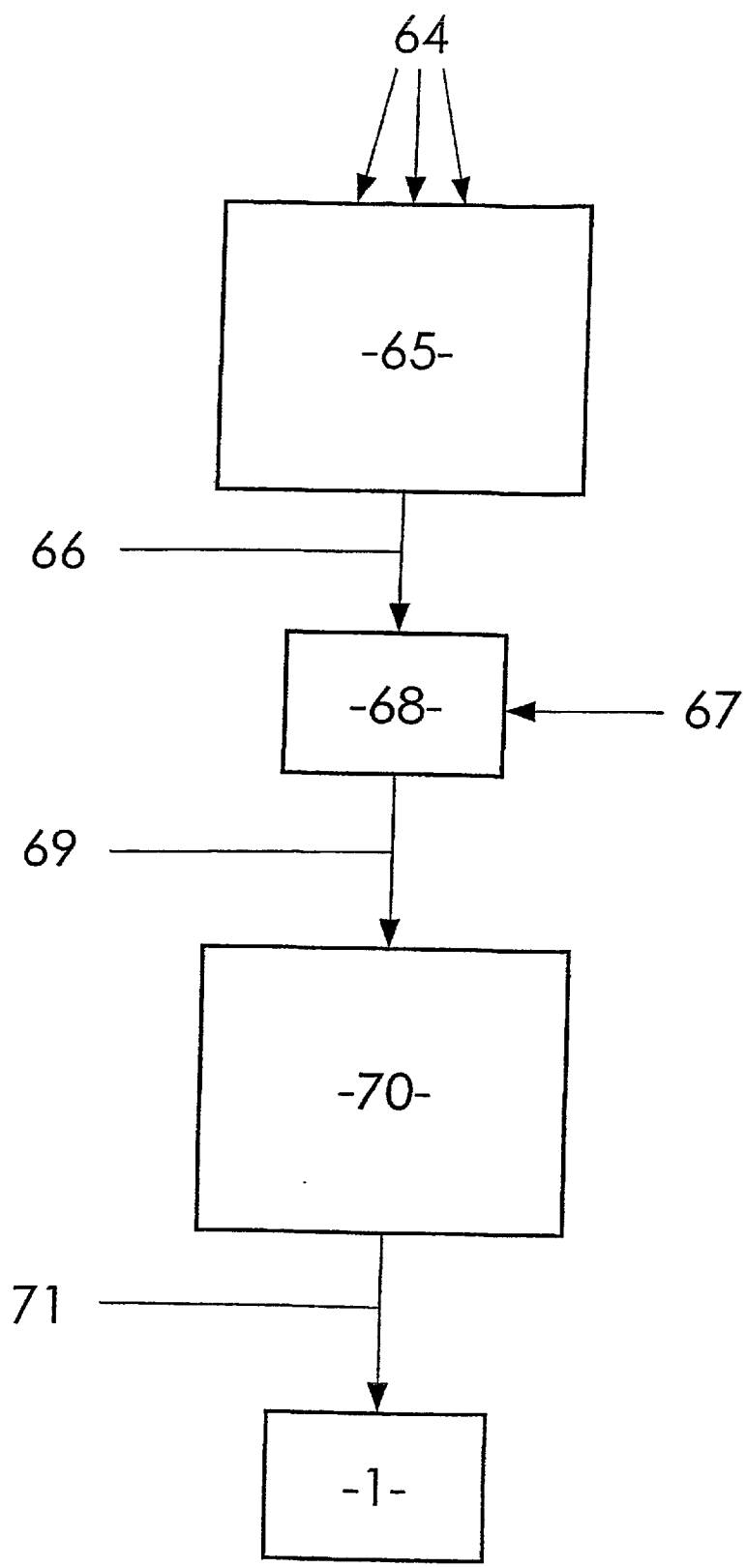
FIG. 12 is a block diagram showing the operation of the ECU

FIGS. 8A, 8B and 8C illustrate these points. For ease of depiction successive cycles have not been plotted on top of each other. The next cycle has been positioned at the end of the preceding cycle. FIG. 8A plots the angular velocity ratio profile—line 27. Line 28 shows the angular velocity ratio profile when the angular velocity ratio is maintained constant over the cycle. FIG. 8A shows instantaneous changes in the angular velocity ratio occurring every 360°. While this is not practical, it is used here and elsewhere as it simplifies the explanation. In practise the required changes in angular velocity ratio will occur over a number of crankshaft degrees. Referring to the angular velocity ratio profile 27, the average angular velocity ratio between any two points 720° apart is equal to the required 0.5 angular velocity ratio for a 4-stroke engine. FIG. 8B plots the resulting relationship 30 between rotary valve position and crankshaft position. This is calculated by integration of the angular velocity ratio against crankshaft angle. Also shown is the relationship 31 between rotary valve position and crankshaft position for an arrangement where the angular velocity ratio is maintained constant at 0.5.

FIG. 8C shows the relative phase 32 plotted against crankshaft angle. "Relative phase" is the phase resulting from the variation of angular velocity ratio during the cycle relative to the phase that would have occurred if the angular velocity ratio had been maintained constant at 0.5. If the relative phase of two points separated by a cycle is the same there has been no phase change between these two points.

The requirement that the average rotary valve angular velocity ratio over the cycle is a required constant value will not in itself mean that the phase of the rotary valve will remain unaltered through out the cycle. Clearly if different velocity ratio profiles are used from one cycle to the next the phase of the rotary valve will change during the cycle despite the fact the average velocity ratio remains constant. The requirement for the average velocity ratio over the cycle to remain constant at 0.5 means that the phase of the rotary valve must remain unaltered at the start and end point of the cycle i.e. the cyclic phase must remain constant. In the event the average angular velocity ratio over the cycle is not constant at 0.5 the angular location of the rotary valve relative to the crankshaft will be different at the end of the cycle compared to the beginning of the cycle and a cyclic phase change will have occurred.

Start/end points of the cycle are not uniquely defined and may be any two points separated by a cycle. So long as one set of start/end points can be found separated by a cycle that have the same phase there has been no cyclic phase change over the cycle defined by these points. To determine whether there is a cyclic phase change in subsequent cycles requires the start point for the next cycle to be chosen as the end point from the previous cycle.

This is illustrated in FIGS. 9A & 9B. FIG. 9A shows the history of angular velocity ratio profile 33 over five engine cycles. FIG. 9B shows the relative phase 34 for the same five cycles. Cycle C1 & C2 have different angular velocity ratio profiles. However they both have the required average angular velocity ratio over the cycle. If point 35 is chosen as the start of the cycle, point 36 is the end of the cycle. Both points clearly have the same phase. If however point 38 is chosen as the start of the cycle, point 39 is the end of the cycle and clearly has a different phase to point 38. For a cycle defined as occurring between points 38 and 39 the valve has been cyclic phase shifted. However as two points 35 and 36 can be found that are separated by one cycle, the cycle defined between points 35 and 36 has maintained its cyclic phase. Further as point 37 is one cycle advanced from point 36 and has the same phase, there has been no cyclic phase change between cycle C1 and cycle C2.

As discussed previously, a rotary valve housing both inlet and exhaust ports in the same valve has very limited ability to vary the overlap duration. This inability to effect significant changes in overlap duration is potentially a major problem.

Overlap is necessary to achieve optimum engine output and brake specific fuel consumption when the engine is operating at wide open throttle conditions and/or high engine speeds. Prior to the advent of exhaust emission regulations the objective of the engine designer was to optimize overlap for top end performance and then attempt to ameliorate the effects of overlap at low throttle settings and low engines speed. Excessive overlap in these conditions resulted in high quantities of exhaust gas trapped in the cylinder that resulted in poor combustion and a rough running engine. Engine designers attempted to overcome these problems by eliminating or minimizing the overlap at low speed low throttle settings. Since the advent of emissions regulations engine designers have sought to retain quantities of exhaust gas in the cylinder to control NOx emissions. This has led to the design of engines where combustion quality is maintained despite the presence of large quantities of exhaust gas in the cylinder. Where exhaust gas is retained as a consequence of gas flows during the overlap period it is referred to as internal EGR (exhaust gas recirculation). Consequently today engine designers are looking for solutions that will optimize wide open throttle performance together with an ability to manage internal EGR at lower speeds and throttle settings.

A novel strategy for overcoming those problems resulting from the inability to make significant changes in the overlap duration when both inlet and exhaust port are in the same rotary valve is as follows:

On prior art rotary valves of the type described in U.S. Pat. No. 5,526,780, the inlet and exhaust opening rates are very high due to the absence of cam ramps. Consequently the duration of the overlap required to achieve optimum performance can be very small by conventional poppet valve standards. Regulation of EGR can be effected by phase shifting the overlap rather than altering the duration of the overlap. For example if the overlap is phase shifted to close the exhaust later (and thereby also open the inlet later) such that the exhaust port is open as the piston starts to descend on the induction stroke while the inlet remains closed, then internal exhaust gas recirculation will be achieved by the filling of the cylinder with exhaust gas during the initial portion of the induction stroke.

Essentially it is possible to achieve similar outcomes to those obtained by varying overlap duration by phase shifting the overlap relative to the crankshaft. This strategy is not available to poppet valve engines, as the phase shifting of the overlap events will inevitably result in the poppet valves colliding with the piston. This problem does not occur with a rotary valve as no portion of the valve projects into the combustion chamber.

This phase shift of the overlap events can be effected by either cyclic phase changing the rotary valve or by leaving cyclic phase unchanged and varying the rotary valves angular velocity within the cycle such that it phase shifts the overlap.

Consider the latter case. This strategy is illustrated in cycle C1 of FIGS. 9A & 9B. In both these figures "OL" means the middle of the overlap process, "EO" means the exhaust open point, "IC" means the inlet close point and "tdc" means top dead centre of the power stroke.

Figure 7:
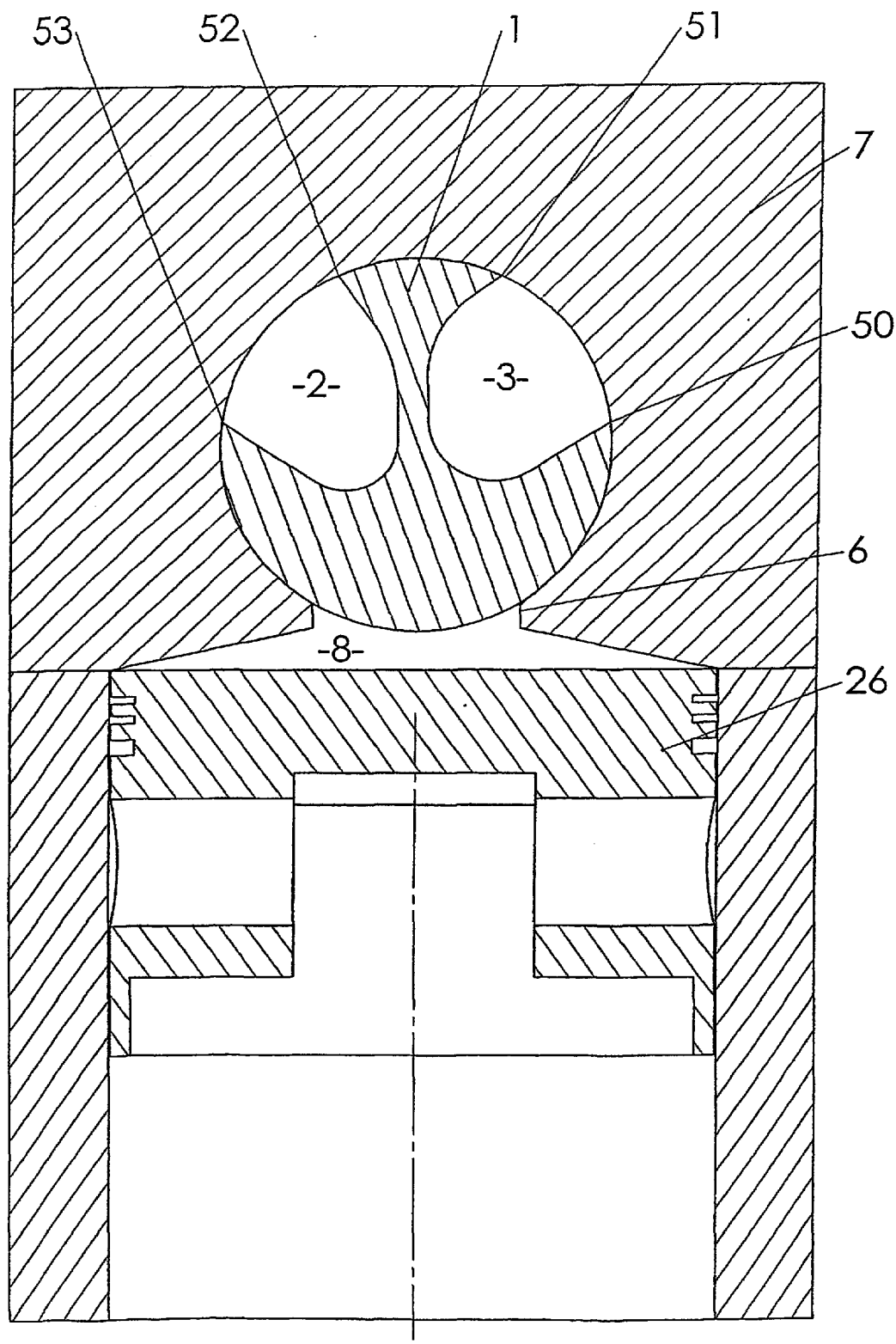
FIG. 7 is the sectional view of FIG. 5 but with the rotary valve located in the start of cycle position.

In order to effect the change in overlap phase with the minimum acceleration, the cycle start/end points are best chosen as far as possible from the event (in this case overlap)

that is to be altered. As the overlap is generally centred at tdc on the induction stroke the start/end point should be selected to occur at tdc on the power stroke—point 35. Therefore there is nominally 360° of crankshaft between the start point and overlap. The position of the rotary valve at the start point is shown in FIG. 7. A typical requirement to implement the above strategy is to move the overlap approximately 45° crankshaft (exhaust close moves from 15° after tdc to 60° after tdc and inlet open moves from 15° before tdc to 30° after tdc). As this change has to occur over 360° crankshaft angle the average angular velocity of the rotary valve must be approximately 12.5% slower than the average angular velocity over the cycle. In order for the end point to coincide with the start point the average angular velocity of the valve over the remaining 360° of the cycle must be 12.5% faster than the average angular velocity over the cycle (see cycle C1 of FIG. 9A). Whilst the overlap events are moved by approximately 45° the exhaust open and inlet close points are moved by a lesser amount due to their closer proximity to the start/end points (see cycle C1 of FIG. 9B).

If the standard exhaust open point 38 occurs at 135° after tdc this strategy would retard the exhaust open point by approximately 17° to 152° after tdc. If the standard inlet close point 40 occurs at 140° before tdc this strategy would move the inlet close point approximately 17° to 123° before tdc. While the later exhaust closing is desirable at the lower speeds and loads the later inlet close is a problem and an alternate strategy may be required to restore the inlet close point.

If it was desired to maintain the exhaust open point and the inlet close point unaltered, a different strategy could be employed. This strategy is illustrated in cycle C2 of FIGS. 9A and 9B. Between the start point 36 and the exhaust open point 39 the rotary valve angular velocity ratio could be held at the average for the cycle. Between the exhaust open (point 39) and overlap (point 41) the rotary valve's angular velocity could be reduced to effect the required 45° overlap phase change. This change must now be effected in approximately (assuming exhaust opens 135° after tdc) 225° requiring an approximate 20% reduction in average angular velocity. A similar increase in rotary valve average angular velocity during the induction stroke is required to enable the inlet valve close at the required point 42.

It is clear that by varying the rotary valve angular velocity over the cycle from an appropriately selected start point substantial changes in the valve timing can be effected without change in the cyclic phase.

Consider the case where the strategy is to effect a cyclic phase change. This strategy is illustrated in cycle C3 of FIGS. 9A and 9B. In this case the rotary valve is cyclic phase shifted by the introduction of one or more engine cycles having an average rotary valve angular velocity that is not equal to the required fixed relation to the angular velocity of the crankshaft.

This cyclic phase change will move the overlap point 43 by an amount identical to the cyclic phase change and this timing can be maintained without the ongoing requirement to vary the angular velocity of the rotary valve. The timing of the inlet close point 44 and the exhaust open point 45 will likewise be phase changed by the same amount assuming a constant angular velocity ratio is maintained after the initial cyclic phase shift.

Alternatively changes in the rotary valve angular velocity during subsequent portions of the cycle can be used to restore the inlet close point and the exhaust open point to their original non cyclic phase shifted position or alternatively to another nominated more effective position. This strategy is illustrated in cycle C4 of FIGS. 9A and 9B.

An appropriate increase in rotary valve angular velocity during the induction stroke can restore or modify the inlet close point 46. The maintenance of an angular velocity ratio of 0.5 will maintain the previous exhaust open point 44. A subsequent reduction in rotary valve angular velocity during the exhaust stroke can return the overlap to its desired location (point 48). A subsequent increase in rotary valve angular velocity during the induction stroke can restore the inlet close point to its desired position (point 49)

Similar changes in the valve timing are therefore achieved phase changing the rotary valve, or by cyclic phase changing the rotary valve and then varying the angular velocity of the rotary valve, as are available by varying the angular velocity of the rotary valve whilst maintaining the cyclic phase constant. A mechanism that can vary the rotary valves angular velocity whilst maintaining the required average angular velocity over the cycle can also effect a cyclic phase change. This can be seen by considering the cycle with a start point 38 and an end point 39 in FIGS. 9A and 9B. The same mechanism that produced average velocity ratios over the first two cycles equal to 0.5 of the average crankshaft angular velocity produced an average velocity ratio of greater than 0.5 during the cycle defined by points 37 & 39. A mechanism that can effect a phase change between any two arbitrarily selected points separated by a cycle must be able to effect the same cyclic phase change between any two other arbitrarily selected points separated by a cycle. The mechanism of the present invention can implement both strategies. The choice of strategy depends on which best suits the operating conditions of the engine.

Where engine speeds are low and the optimum emissions strategy requires the ultimate tailoring of all events the constant cyclic phase strategy will generally be preferred. Where engine speeds are high and the accelerations (and therefor valve drive torque) required to alter the valve timing is high the preferred strategy may be to effect a cyclic phase change and either maintain a constant angular velocity ratio over subsequent cycles or alternatively introduce a varying angular velocity ratio of reduced magnitude.

A typical strategy may implement both approaches. When the constant cyclic phase strategy is being used and engine load and speed conditions remain constant, each cycle will produce the same rotary valve angular speed variations and the phase will remain constant from one cycle to the next. This pattern of events will continue indefinitely until there is a change in engine load and speed. Assume there is a step change in the engine speed and load. If the optimum timing for the new engine load and speed is best achieved by maintaining the cyclic phase constant there will be a change in the rotary valves angular velocity profile from that prior to the step change in load and speed conditions. Between the cycle using the old rotary valve angular velocity profile and the cycle using the new rotary valve angular velocity profile, there will be phase changes (and consequently changes in valve timing) but the cyclic phase will remain unchanged. The new rotary valve angular velocity profile will be repeated every cycle until there is another change in engine load and speed. Prior to this change phase will remain constant. Assume there is another step change in the engine speed and load and, this time, the optimum strategy is to introduce a cyclic phase change and thereafter maintain a constant rotary valve angular velocity ratio. This cyclic phase change will generally occur over a single cycle although there are occasions where it may be necessary to implement it over a small number of cycles. Once this cyclic phase change has occurred there will be no further change until there is a further change in engine load and speed. Thus cyclic phase change only occurs intermittently and when it does it occurs over a small number of cycles. This is different to the strategy where cyclic phase is maintained constant. The rotary valve angular velocity variations occur every cycle.

Either way, a mechanism that can vary the rotary valve angular velocity within the cycle whilst maintaining the required average angular velocity over the engine cycle when applied to a rotary valve incorporating both inlet and exhaust ports in the same rotary valve can achieve performance outcomes similar to those achievable on an engine where the location of the inlet open, inlet close, exhaust open and exhaust close are all independently variable. In this case the available variations in valve timings are sufficient to effect significant gains in emissions and engine performance FIG. 1 depicts a first embodiment of the present invention in which rotary valve 1 has an inlet port 2 at one end and exhaust port 3 at the other end. These ports respectively connect with openings 4 and 5 in the periphery of the central cylindrical portion of rotary valve 1. As rotary valve 1 rotates, openings 4,5 periodically align with a similar shaped window 6 in cylinder head 7 opening directly into combustion chamber 8 at the top of cylinder 9. This alignment allows the passage of gases to and from cylinder 9. During the compression and power strokes the periphery of rotary valve 1 covers window 6 in cylinder head 7 preventing escape of gases from combustion chamber 8.

Rotary valve 1 is supported by two bearings 10. These bearings 10 allow the rotary valve 1 to rotate in bore 11 of cylinder head 7.

Rotary valve 1 is driven by hollow armature electric servomotor 13. Rotor 12 of hollow armature electric servomotor 13 is mounted on periphery of rotary valve 1 at the inlet end of rotary valve 1. Stator 14 of hollow armature electric servomotor 13 is mounted concentric to rotor 12.

Sensors monitoring engine and engine operating parameters such as engine speed, engine load, engine temperature, and air temperature send signals 64 to the ECU 65. The ECU by means of either a look up table or calculation of algorithms or both determines the required valve timing and the strategy required to achieve this timing whilst ensuring the cyclic phase will remain unchanged (i.e. the average rotary valve angular velocity over the cycle equals 0.5 the average crankshaft velocity over the same cycle) during all cycles. Occasionally the strategy may require a change in cyclic phase to be implemented over a small number of cycles in which case the requirement for constant cyclic phase is suspended during these small number of cycles. The ECU outputs the control signal 69 to the servo amplifier that conditions the input power 67 to produce the required power input 69 to the electric motor 70. Electric motor 70 drives rotary valve 1 via drive means 71. The varying electric motor speed during the cycle produces the desired valve timing.

Figure 5:
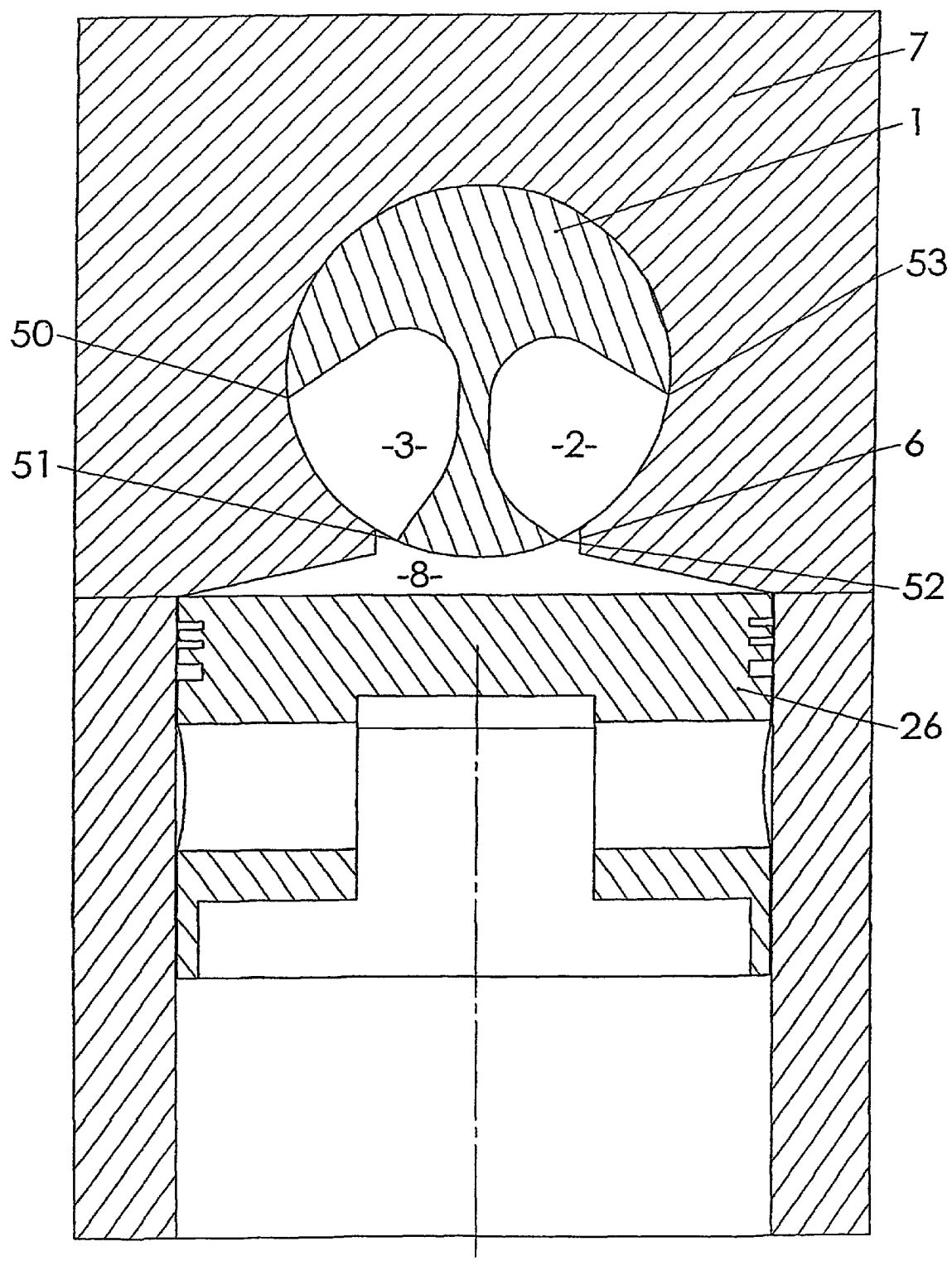
FIG. 5 is a sectional view on line AA of FIG. 1.

A typical overlap arrangement designed for wide-open throttle operation at high load/speed for the first embodiment is shown in FIG. 5. When piston 26 is at the top of its stroke both inlet port 2 and exhaust port 3 are open to combustion chamber 8. With a correctly designed exhaust system negative pressure in exhaust port 3 will draw air from inlet port 2 into the combustion chamber 8 and burnt gas from combustion chamber 8 into exhaust port 3.

When engine operation returns to low speed/low throttle the rotary valve drive mechanism can adopt one of two strategies. Either it can maintain cyclic phase constant by varying the angular velocity ratio of the rotary valve over the cycle while maintaining the required average velocity ratio over the cycle, or it can effect a cyclic phase change over a small number of cycles and subsequently maintain cyclic phase constant by varying the angular velocity ratio over the cycle whilst maintaining the required average velocity ratio over the cycle.

Figure 6:
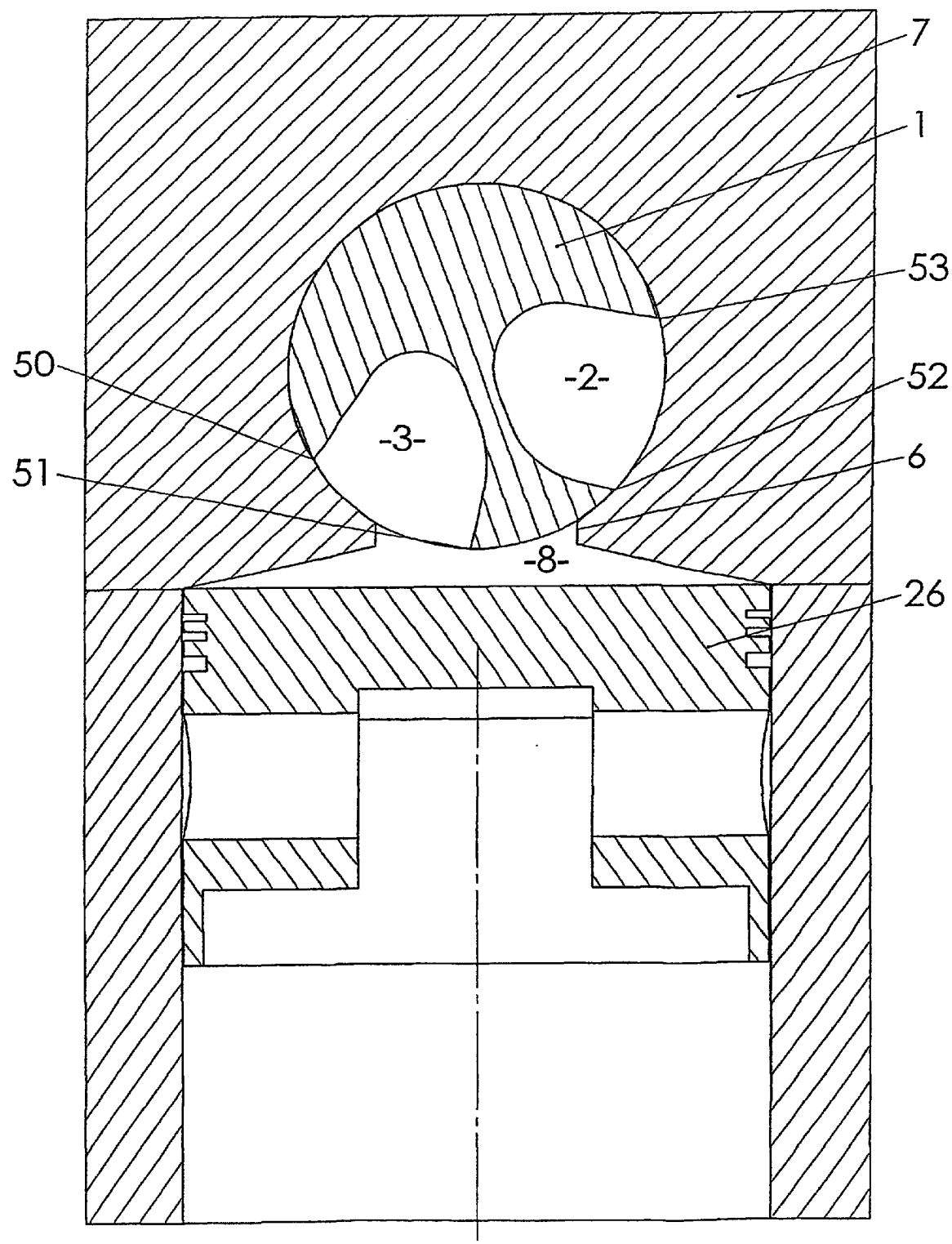
FIG. 6 is the sectional view of FIG. 5 but with the rotary valve phase shifted.

Consider the first strategy where cyclic phase remains constant. FIG. 7 shows the rotary valve 1 located at an appropriate start point. The objective is to phase shift the overlap 45° of crankshaft from the position shown in FIG. 5 to that shown in FIG. 6 so that internal gas recirculation is promoted. The appropriate variation in angular velocity ratio is shown in cycle C1 of FIG. 9A. As rotary valve 1 rotates from its start position in FIG. 7 its angular velocity is reduced relative to the angular velocity of crankshaft 25. This reduced angular velocity of rotary valve 1 will result in the exhaust open edge 50 reaching the window 6 approximately 17° later than if the average angular velocity had been maintained. The greater the angle the crankshaft rotates through, the greater will be the loss of phase. After 360° of crankshaft rotation the piston has returned to tdc and rotary valve 1 instead of having its inlet open edge 52 and its exhaust close edge 51 both located within window 6 as shown in FIG. 5, now has only exhaust close edge 51 located within window 6 as shown in FIG. 6. As the piston starts to descend the exhaust gas will be drawn back into combustion chamber 8. Later when the inlet open edge 52 is also located in window 6 (i.e. overlap) the descending piston will draw exhaust from exhaust port 3 and air from inlet port 2. Overlap has been delayed by approximately 45° crankshaft. Later still when exhaust port close edge 51 is no longer located with in window 6, air will be drawn from inlet port 2. During the period from tdc to when the exhaust closes approximately 60° after tdc a considerable quantity of exhaust will have been drawn into the cylinder 9. From the overlap position (point 54) the mechanism will increase the angular velocity of the rotary valve 1 above the required average angular velocity over the cycle. The phase lost in the first 360° of crankshaft rotation will gradually be caught up. The inlet close point 40 (when inlet close edge 53 is no longer in window 6) will be later by approximately 17° than would have been the case had the angular velocity of rotary valve 1 been maintained constant. At the end of the engine cycle rotary valve 1 will have returned to its initial position shown in FIG. 7 ready to commence the next cycle.

The alternate strategy effects a cyclic phase change between the rotary valve 1 and crankshaft 25 as shown in cycle C3 in FIGS. 9A and 9B. This 45° cyclic phase change results in identical relocation of the overlap to that achieved in the first strategy i.e. to the position shown in FIG. 6. This phase change has also moved the inlet close point 44 and exhaust open point 45 by an identical amount i.e. 45° crankshaft. This compares to the approximate 17° in the previous strategy. This phase shift strategy can take place over several cycles if it is desired to keep the accelerations low.

If it is desired to move the inlet close and/or the exhaust open point(s) from the position that resulted from this cyclic phase shift, this can be achieved by varying the rotary valve's angular velocity over the cycle as used in the original strategy. This strategy is shown in cycles 4 and 5 in FIGS. 9A and 9B. In order to restore the inlet close point to its angular location prior to this phase shift, the rotary valve drive mechanism now increases the angular velocity of rotary valve 1 during the period that the inlet port 2 is open to combustion chamber 8 (between points 55 & 46). Once inlet port 2 is closed the rotary valve drive mechanism now adjusts the angular velocity of rotary valve 1 such that desired exhaust open point 47 is achieved. In the case it is desired to maintain the same exhaust open point prior to the phase shift, hence the angular velocity of rotary valve 1 is maintained at the average velocity required over the cycle (points 46–47). Once exhaust port 3 is open to the combustion chamber 8 the rotary valve drive mechanism reduces the angular velocity of rotary valve 1 to restore the overlap to its phase adjusted position (point 48) of the previous cycle.

During the remainder of the cycle C5 the rotary valve mechanism adjusts the angular velocity of rotary valve 1 such that inlet close point 49 is in the same position as on the previous cycle i.e. it adjusts the angular velocity of rotary valve 1 to ensure that the average angular velocity of rotary valve 1 over the cycle between points 46 & 49 has the required fixed relation to the angular velocity of the crankshaft 25 over the same cycle.

Figure 2:
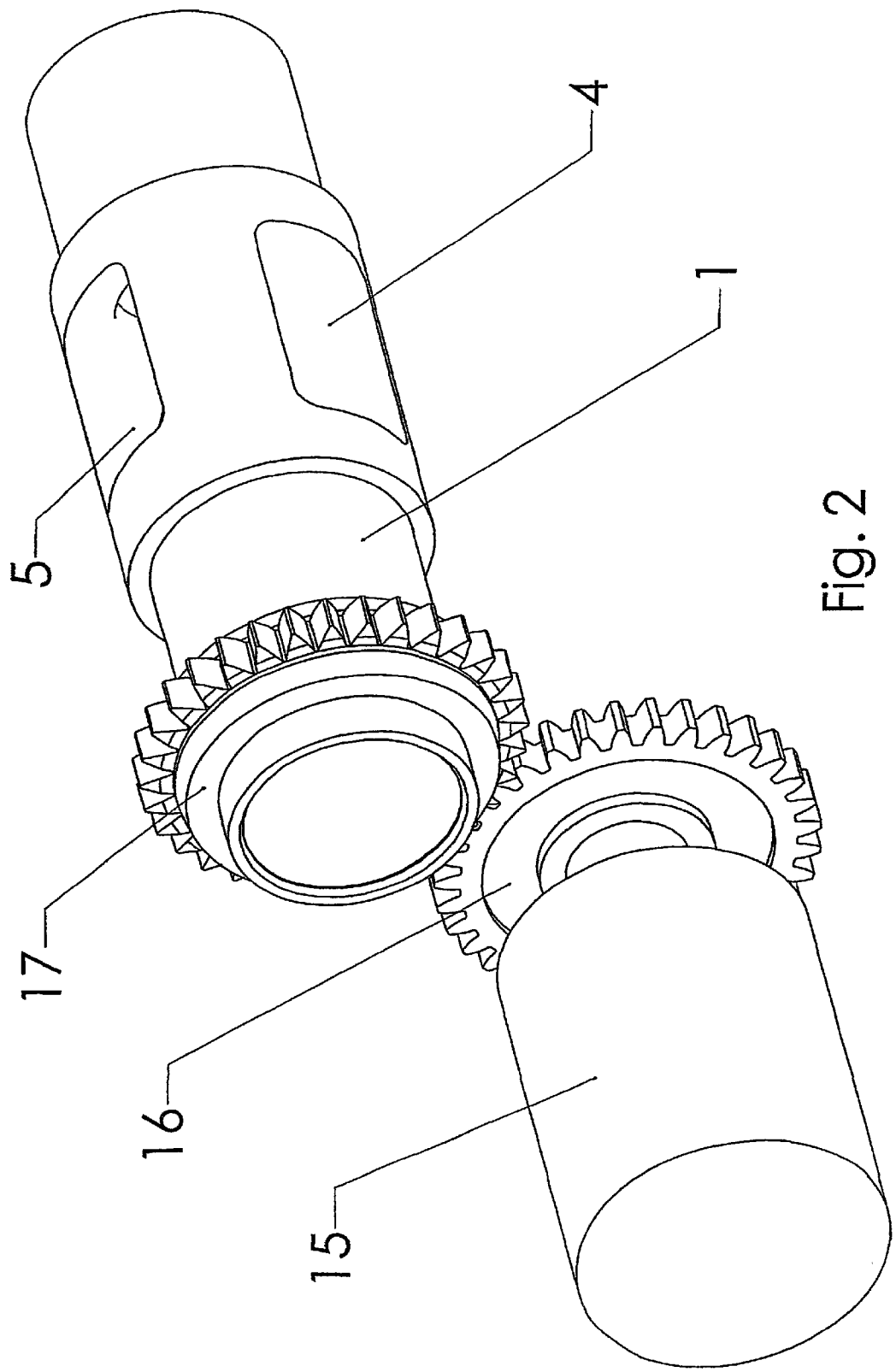
FIG. 2 is an isometric view of a second embodiment of a rotary valve having a variable valve timing mechanism in accordance with the present invention.

In a second embodiment as shown in FIG. 2 an electric servo motor 15 drives transfer gear 16 either directly or via a gear reduction box. Transfer gear 16 drives valve gear 17 mounted on the periphery of the inlet end of rotary valve 1.

Figure 3:
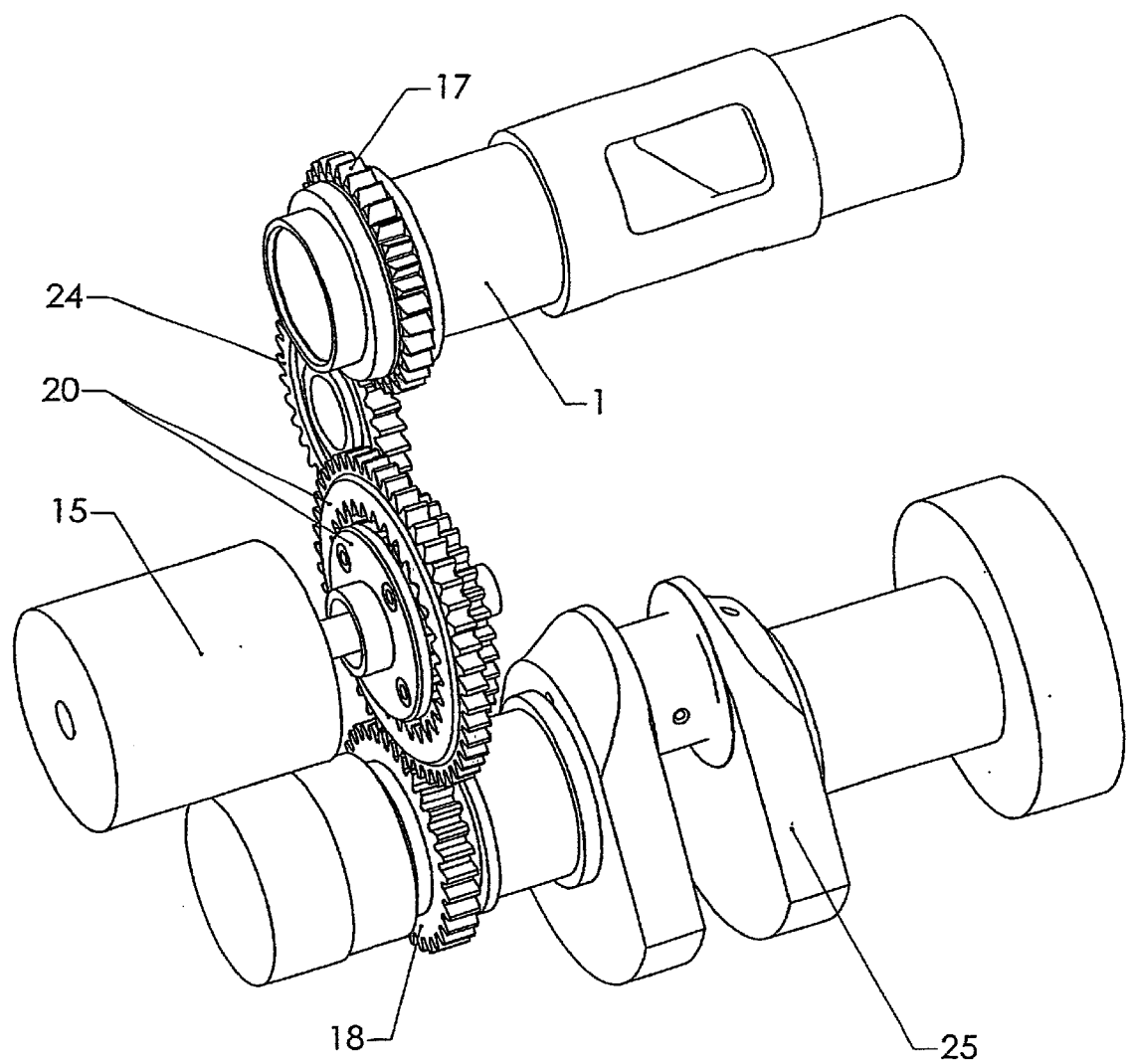
FIG. 3 is an isometric view of a third embodiment of a rotary valve having a variable valve timing mechanism in accordance with the present invention.
Figure 4:
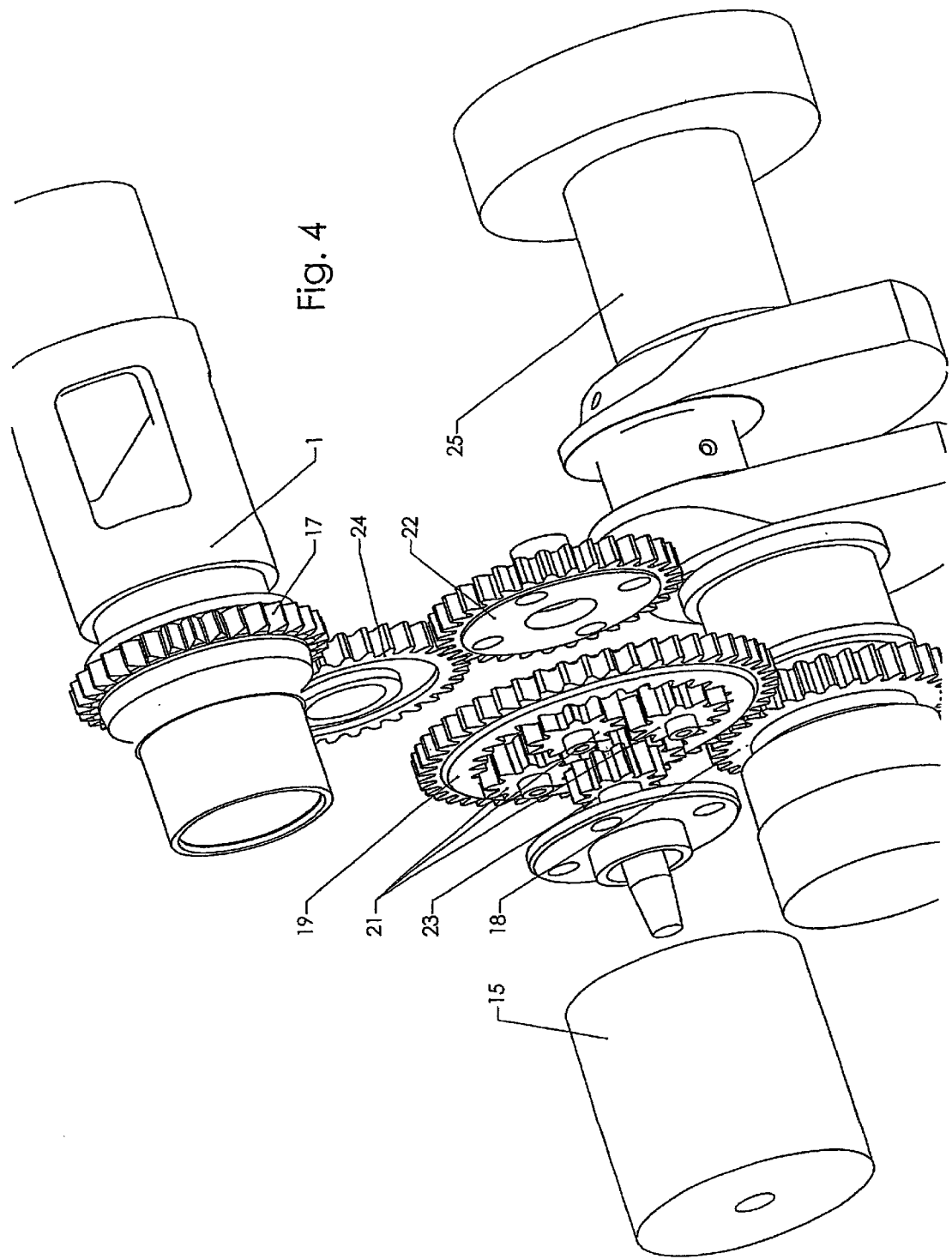
FIG. 4 is an exploded isometric view of FIG. 3.

In a third embodiment as shown in FIGS. 3 & 4, crankshaft gear 18 drives ring gear 19 of epicyclic gear set 20. Planet gears 21 drive gear 22 that drive rotary valve gear 17 through idler gear 24. Electric servomotor 15 drives sun gear 23 of epicyclic gear set 20. In the event the electric servo motor 15 is stationary or locked out motion is transferred from the crankshaft gear 18 to the rotary valve gear 17 where rotary valve gear 17 maintains a constant angular velocity ratio to the crankshaft gear 18. When electric servo motor 15 drives sun gear 23 it either increases or decreases the angular velocity ratio between rotary valve gear 17 and crankshaft gear 18, depending on which direction sun gear 23 is rotated.

In this arrangement the gear drive from crankshaft 25 provides the gross motion and electric servomotor 15 provides the variation in motion required to vary the angular velocity of rotary valve 1 within the engine cycle. This arrangement has the advantage that at high engine speeds where the power required to drive rotary valve 1 is a maximum and valve timing variations are unlikely to be required, sun gear 23 can be locked and all the power required to drive the valve is provided by crankshaft 25. At low speeds and low loads where the power required to drive the rotary valve 1 is a minimum and the requirement to vary rotary valve timing is at a premium, electric servomotor 15 can provide the necessary variations without having to be sized for operation at high engine speeds.

A fourth embodiment (not shown) involves a variation of the arrangement shown in FIGS. 3 & 4, wherein crankshaft gear 18 drives ring gear 19 of epicyclic gear set 20. Sun gears 23 drives gear 22 that drive rotary valve gear 17 through idler gear 24. Electric servomotor 15 drives planet gears 21 of epicyclic gear set 20. In the event the electric servo motor 15 is stationary or locked out motion is transferred from the crankshaft gear 18 to the rotary valve gear 17 where rotary valve gear 17 maintains a constant angular velocity ratio to the crankshaft gear 18. When electric servo motor 15 drives planet gears 21, it either increases or decreases the angular velocity ratio between rotary valve gear 17 and crankshaft gear 18, depending on which direction planet gears 23 are rotated.

It should be noted that whilst FIGS. 5–7, 8a–8b, 9a–9b have been used to describe the operation of the first embodiment of the present invention, they are also applicable to the second, third and fourth embodiments of the present invention.

What is claimed is:

1. A variable valve timing mechanism for an internal combustion engine, said engine comprising a crankshaft, a cylinder head, a combustion chamber, and at least one rotary valve, said rotary valve having at least two ports terminating as openings in its periphery, said cylinder head having a bore in which said rotary valve rotates, a window in said bore communicating with said combustion chamber, said openings successively aligning with said window by virtue of said rotation, and a drive mechanism driving said rotary valve, characterised in that said at least two ports comprise an inlet port and an exhaust port, and said drive mechanism varies the angular velocity of said rotary valve at least within a portion of at least one engine cycle whilst maintaining an average angular velocity over said at least one engine cycle that has a fixed relation to the average angular velocity of said crankshaft over said at least one engine cycle, and wherein said drive mechanism produces either a symmetric or assymetric angular velocity ratio profile for said rotary valve with respect to said crankshaft.

2. A variable valve timing mechanism as claimed in claim 1, wherein said drive mechanism intermittently varies the angular velocity of said rotary valve over one or more other engine cycles such that the average angular velocity over said one or more other engine cycles varies from said fixed relation.

3. A variable valve timing mechanism as claimed in claim 1, wherein said drive mechanism comprises an electric motor.

4. A variable valve timing mechanism as claimed in claim 3, wherein said electric motor is directly coupled to said rotary valve.

5. A variable valve timing mechanism as claimed in claim 3, wherein said electric motor drives one or more intermediate drive members operably engaged with said rotary valve.

6. A variable valve timing mechanism as claimed in claim 5, wherein said one or more intermediate drive members comprises any one of a gear, gear train, chain drive assembly or a belt drive assembly.

7. A variable valve timing mechanism as claimed in claim 1, wherein said drive mechanism comprises a primary drive means for transmitting motion between said crankshaft and said rotary valve, said primary drive means having at least one epicyclic gear set, and a secondary drive means driving a sun gear of said epicyclic gear set.

8. A variable valve timing mechanism as claimed in claim 1, wherein said drive mechanism comprises a primary drive means for transmitting motion between said crankshaft and said rotary valve, said primary drive means having at least one epicyclic gear set, and secondary drive means driving one or planet gears of said epicyclic gear set.

9. A variable valve timing mechanism as claimed in claim 7 wherein said secondary drive means is an electric motor.

10. A variable valve timing mechanism as claimed in claim 1, wherein said drive mechanism is operably connected to an electronic control unit which controls the angular velocity of said drive mechanism and hence the angular velocity of said rotary valve.

11. A variable valve timing mechanism as claimed in claim 7, wherein said secondary drive means is operably connected to an electronic control unit which controls the angular velocity of said secondary drive means and hence the angular velocity of said rotary valve.

12. A variable valve timing mechanism for an internal combustion engine, said engine comprising a crankshaft, a cylinder head, a combustion chamber, and at least one rotary valve, said rotary valve having at least two ports terminating as openings in its periphery, said cylinder head having a bore in which said rotary valve rotates, a window in said bore communicating with said combustion chamber, said openings successively aligning with said window by virtue of said rotation, and a drive mechanism driving said rotary valve, characterised in that said at least two ports comprise an inlet port and an exhaust port, and said drive mechanism is controlled by a control means to vary the angular velocity of said rotary valve, said control means controlling said drive mechanism in response to sensed engine parameters to produce variations of the angular velocity of said rotary valve at least within a portion of at least one engine cycle whilst maintaining an average angular velocity over said at least one engine cycle that has a fixed relation to the average angular velocity of said crankshaft over said at least one engine cycle, and wherein said drive mechanism produces either a symmetric or assymetric angular velocity ratio profile for said rotary valve with respect to said crankshaft.

13. A variable valve timing mechanism as claimed in claim 12, wherein said control means is an electronic control unit.

* * * * *